(12) United States Patent
Hahn

(10) Patent No.: US 12,742,891 B2
(45) Date of Patent: Sep. 22, 2026

(54) MULTISENSOR SYSTEM AND SYSTEM FOR DETERMINING A POSITION OR ORIENTATION

(71) Applicant: Robert Bosch GmbH, Stuttgart (DE)

(72) Inventor: Jochen Hahn, Nufringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 763 days.

(21) Appl. No.: 17/446,354

(22) Filed: Aug. 30, 2021

(65) Prior Publication Data

US 2022/0075081 A1 Mar. 10, 2022

(30) Foreign Application Priority Data

Sep. 9, 2020 (DE) ........................ 102020211302.5

(51) Int. Cl.
*G01S 19/45* (2010.01)

(52) U.S. Cl.
CPC .................................. *G01S 19/45* (2013.01)

(58) Field of Classification Search
CPC ...................................................... G01S 19/45
USPC ........................................................ 702/150
See application file for complete search history.

(56) References Cited

U.S. PATENT DOCUMENTS 6,735,630 B1 5/2004 Gelvin et al.
8,755,469 B1 6/2014 Su
10,166,999 B1 1/2019 Weng
12,306,316 B2 * 5/2025 Berntorp ................ G01S 19/45
2015/0276936 A1 10/2015 Friend et al.
2015/0285835 A1 * 10/2015 Karahan ................ G01P 21/00 73/1.79
2018/0321353 A1 * 11/2018 Patel ................. G01C 21/1654
2018/0332369 A1 * 11/2018 Jadidi ..................... H04Q 9/00

FOREIGN PATENT DOCUMENTS

CN 101319902 A 12/2008
CN 103019245 A 4/2013
CN 203396956 U 1/2014
DE 102018118528 A1 2/2019
DE 102018216809 A1 4/2020

OTHER PUBLICATIONS

Li and Cao: "Coordinatied Workload Scheduling in Hierarchical Sensor Networks for Data Fusion Applications", Journal of Computer Science and Technology, 23 (2008), pp. 355-364.
Ramesh and Rangan: "Data Reduction and Energy Sustenance in Multisensor Networks for Landsilde Monitoring", IEEE Sensors Journal, 14(5), (2014), pp. 1555-1563.
Gyuo and Wang: "A new asynchronous multi-sensor track fusion filter with feedback for target tracking," Microcomputer Information, 25 (2009), pp. 1-2, with an English abstract; https//www.cnki.net.

* cited by examiner

*Primary Examiner* — Aditya S Bhat
(74) *Attorney, Agent, or Firm* — NORTON ROSE FULBRIGHT US LLP

(57) ABSTRACT

A partitioning of the signal processing and signal fusion of signals in a multisensor system. The individual processing steps or fusions may be carried out in separate subunits, the individual subunits preferably being situated at the signal sources.

8 Claims, 3 Drawing Sheets

MULTISENSOR SYSTEM AND SYSTEM FOR DETERMINING A POSITION OR ORIENTATION

CROSS REFERENCE

The present application claims the benefit under 35 U.S.C. § 119 of German Patent Application No. DE 102020211302.5 filed on Sep. 9, 2020, which is expressly incorporated herein by reference in its entirety.

FIELD

The present invention relates to a multisensor system. The present invention furthermore relates to a system for determining a position or an orientation using such a multisensor system.

BACKGROUND INFORMATION

At present, numerous methods and systems for establishing a position or an orientation are available. In particular, data from multiple signal sources may be taken into consideration in the process. The individual sample values or data are generally fused in a central processing unit and processed into a single output sample value or output data element.

China Patent Application No. CN 101319902 describes a combined locating and orientation device. In addition to microelectromechanical sensors, the device also includes a receiver of a global positioning system as well as an electronic compass.

SUMMARY

The present invention provides a multisensor system and a system for determining a position and an orientation. Advantageous specific embodiments of the present invention are disclosed herein.

An example embodiment of the present invention provides for the following:

A multisensor system including a first number of signal sources and a second number of signal processing units. The signal sources are each designed to provide a (discretized) signal corresponding to a detected variable. The signal processing units are each designed to receive signals of at least one signal source and/or at least one other signal processing unit.

The signal processing units are furthermore designed to process, in particular, to fuse, the received signals. Furthermore, the signal processing units are designed to provide the processed signals to a further signal processing unit or a final processing unit.

Furthermore, an example embodiment of the present invention provides:

A system for determining a position or an orientation using a multisensor system according to the present invention.

The present invention is based on the finding that, in multisensor systems, the signals of individual signal sources having a different clock rate or sampling frequency may be provided. The clock rate of a signal source may be steady, change over time, for example as a function of the temperature, or also be discontinuous. If the signals of all signal sources are processed in a central processing unit, this processing unit must be adapted to the maximally occurring clock rate of the signal sources. In addition, it may be necessary to carry out a conversion of a sampling rate of a signal from a signal source with a sampling rate which changes over time to be able to further process the signal together with other signals. For this purpose, a processing unit having a high performance, and accordingly also a high energy expenditure, is generally required.

In accordance with an example embodiment of the present invention, this finding is taken into account and there is provided a signal processing and a signal fusion in a multisensor system which makes all arising signals of the individual signal sources possible with as little latency and as high a robustness as possible, and in the process requires as low a power consumption as possible. For this purpose, in accordance with an example embodiment of the present invention, the fusion of signals partitioned/distributed, as well as the entire calculation. In the process, the partial calculation and signal fusion preferably take place incrementally and in multiple separate processing units. Feedback loops may possibly be provided to be able to implement stable control loops as a result of the feedback of signals.

The individual signal sources of the multisensor system may generally provide arbitrary data. For example, the data or signals provided by the signal sources may be a value which corresponds to a suitable physical variable. In addition, however, data which were received via a radio interface or the like are also possible. In this way, for example, highly precise pieces of time information may be received, and a spatial position may be derived from these pieces of time information, as is possible, for example, with a global satellite navigation system. Basically, for example, a signal processing unit may also be regarded as a signal source.

In the process, the individual signal sources of the multisensor system may provide their signals in each case at different sampling rates or clock frequencies. Accordingly, the further processing of the respective signals also has to be adapted to this sampling rate or clock frequency.

It may possibly also be necessary to initially process signals of multiple signal sources together, or to fuse them, and thereupon use this result as an intermediate result for a further processing. For this intermediate result, a sampling rate or clock frequency which differs from the sampling rate or clock frequency of the original sensor signals may also be necessary.

The fusion or the individual processing steps of the sensor signals may be executed by multiple signal processing units. In this way, the processing of the signals of the signal sources as well as the fusion of signals may be segmented into multiple smaller units. Each of these smaller units may be individually adapted to the corresponding input signals, in particular, to the corresponding clock rate or sampling frequency. Since in the process only very few processing operations are required in each case, these operations may be executed particularly efficiently, in particular, with minor latency and minor energy consumption.

In this way, the fusion and processing of the signals of the individual signal sources may be segmented into multiple smaller units. In particular, it is also possible, for example, to situate signal processing units in a cascade-like manner. In this case, for example, initially one or multiple signal processing unit(s) may process signals of the signal sources, and the results of these signal processing units may be forwarded to one or multiple further signal processing units to carry out a further processing or fusion of the signals there. In this way, already preprocessed or fused signals may be provided at a final processing unit so that only relatively few operations still have to be carried out also in the final processing unit. Accordingly, the final processing unit is also able to carry out the necessary tasks particularly efficiently, with low latency and low power consumption.

According to one specific embodiment of the present invention, the processing of the received signals in the signal processing units includes a fusion of the received signals. Accordingly, the fused signals may be provided to a further signal processing unit or the processing unit.

According to one specific embodiment of the present invention, an output of a signal processing unit may be coupled to an input of a signal processing unit situated earlier in the signal flow. In this way, a feedback in the signal flow between multiple consecutively situated signal processing units is possible, for example.

According to one specific embodiment of the present invention, the individual signal processing units preferably each process signals having an identical or at least approximately identical clock rate. In this way, the processing speed of the individual signal processing units may be adapted as optimally as possible to the particular clock rates. If the signal sources of the first number of signal sources supply signals having different clock rates or sampling frequencies, these signals may be processed by accordingly adapted different signal processing units. In the process, in particular, signals of signal sources having identical clock rates may be processed and, for example, fused at a shared signal processing unit.

According to one specific embodiment of the present invention, the signal processing units are designed to provide the fused received data at a clock rate which corresponds to an input clock rate of the respective next instance, i.e., for example, the further signal processing unit or the final processing unit. In particular, the data output by the signal processing unit may be provided at a clock rate which corresponds to a minimally necessary input clock rate of the respective next instance. In this way, the intermediate results of the signal processing units are available in each case at a best possible clock rate or sampling frequency. By reducing the sampling rate to the minimally necessary sampling rate of the next signal processing unit, it may be ensured that the data are provided with the necessary quality, without using an unnecessarily high sampling rate in the process, which would possibly cause an increased energy consumption. It may possibly also be useful that a downstream signal processing unit may at least temporarily deactivate an upstream signal source and/or an upstream signal processing unit. In this way, the energy consumption may also be further reduced.

According to one specific embodiment of the present invention, each signal source of the first number of signal sources is connected either to a signal processing unit or directly to the final processing unit. In this way, the signals of the individual signal sources may each be processed in the best possible manner according to their properties, and possibly be fused.

According to one specific embodiment of the present invention, a signal processing unit may also include at least one signal source in each case. A signal processing unit and a signal source thus form a shared unit. In this way, it is possible to directly process the signals provided by the particular signal source by the corresponding signal processing unit. A transfer of the unprocessed signals of the signal source may thus be dispensed with.

According to one specific embodiment of the present invention, the signal processing unit or a combination of a signal processing unit and a signal source may be implemented as a system on a chip. This enables a particularly compact and efficient implementation.

According to one specific embodiment of the present invention, the first number of signal sources may, for example, include a receiver for a global navigation satellite system (GNSS), such as for example GPS, Galileo or the like, a mobile radio communication receiver, a receiver for a local radio network, for example WLAN, Bluetooth, NFC, a magnetic field sensor, a pressure sensor, a rotation rate sensor, an acceleration sensor and/or a gyroscope. In addition, arbitrary other suitable signal sources are also possible, of course. In particular, signal sources having different accuracy or reliability are possible. It is also possible to efficiently process signal sources which require differently complex processing, editing or fusion of sensor data by the multisensor system according to the present invention.

In particular, the signal sources may also include sensors based on microelectromechanical systems (MEMS). Such MEMS may be efficiently implemented with corresponding signal processing units as a compact shared system.

The above-mentioned embodiments and refinements may be arbitrarily combined with one another, if useful. In particular, the signal processing may also be expanded to more than a three-stage unit for signal processing. Further embodiments, refinements and implementations of the present invention also include not explicitly described combinations of features of the present invention which are described above or hereafter with respect to the exemplary embodiments. In particular, those skilled in the art will also add individual aspects as improvements or supplements to the particular basic forms of the present invention, in view of the disclosure herein.

BRIEF DESCRIPTION OF THE DRAWINGS

Further features and advantages of the present invention are described hereafter based on the figures.

DETAILED DESCRIPTION OF EXAMPLE EMBODIMENTS

Figure 1:
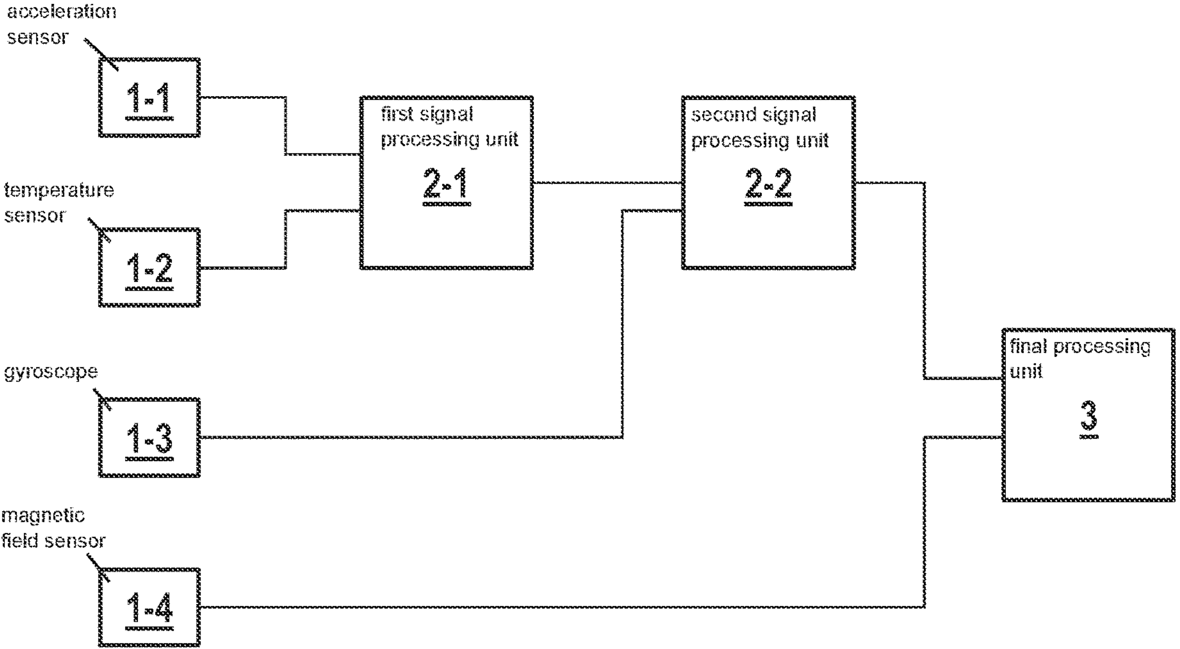
FIG. 1 shows a schematic representation of a block diagram of a multisensor system according to one specific embodiment of the present invention.

FIG. 1 shows a schematic representation of a block diagram of a multisensor system 10 according to one specific embodiment of the present invention. In this example, multisensor system 10 includes four sensors 1-*i* as well as two processing units 2-*j*. In addition, multisensor system 10 may include a final processing unit 3. The number of four signal sources 1-*i* and two signal processing units 2-*j* shown here, as well as the configurations in the following examples, do not represent a limitation of the present invention and serve only as examples to explain the basic principle according to the present invention.

Signal sources 1-*i* may generally be arbitrary suitable signal sources, which may provide a desired or required signal. For example, the signals of signal sources 1-*i* may be signals which are suitable for ascertaining a location or position or a movement or movement direction. Basically, however, arbitrary other fields of application are also possible.

For example, signal sources 1-*i* may include sensors, such as for example a pressure sensor, a magnetic field sensor, a rotation rate sensor, an acceleration sensor, a gyroscope or the like. In particular, such sensors may, for example, be implemented as microelectromechanical systems (MEMS). However, arbitrary other suitable sensors are also possible as signal sources.

In addition, signal sources 1-*i* may also include arbitrary further suitable signal sources. For example, signal sources 1-*i* may include a receiver for a global navigation satellite system, such as for example GPS, Galileo or the like. Furthermore, receivers for a mobile radio communication system are also possible. In particular, such receivers of a mobile radio communication system may, for example, also receive pieces of information from a connected base station to ascertain, for example, pieces of information about a position therefrom.

Furthermore, receivers for a local radio network, such as for example WLAN, Bluetooth, near field communication (NFC) or the like are also possible, for example. In particular, such receivers may, for example, also derive pieces of position or movement information from the received data. Such pieces of information may, for example, be included in the system data of a wireless communication. However, a position or movement ascertainment based on triangulation or the like is also basically possible.

As is already apparent from the preceding comments, the data of the individual signal sources 1-*i* may have a very different design. In particular, the data of the individual signal sources 1-*i* may also have a different complexity, have a different accuracy, or also be provided at a different clock rate. Furthermore, a different further processing of the corresponding signals is also required, depending on the type of signal source 1-*i*.

Depending on signal source 1-*i* or depending on properties of the provided signals, a different further processing, and possibly fusion, of individual signals is thus necessary. For this purpose, multiple signal processing units 2-*j* are provided in multisensor system 10. The individual signal processing units 2-*j* may, for example, directly receive and process signals of one or multiple signal sources 1-*i*. In addition or as an alternative, several of signal processing units 2-*j* may also receive and process signals of other signal processing units 2-*j*.

The processing speed and the operation which are carried out by the particular signal processing units 2-*j* may in each case be individually adapted to the signals received from the corresponding signal processing units. In particular, the processing speed may be adapted to the clock rate at which the individual signal sources 1-*i* provide their signals. For example, a signal processing unit 2-*j* may receive signals from multiple signal sources 1-*i* and fuse them in accordance with the clock rate at which the signals are provided. The result of the processing may furthermore be provided to a signal processing unit 2-*j* at a clock rate which corresponds to a clock rate which is expected at the input by a downstream signal processing unit 2-*j*.

Multisensor system 10 may furthermore include a final processing unit 3, which receives output values of signal processing units 2-2 connected to final processing unit 3, and possibly also directly receives signals of signal sources 1-4 connected to final processing unit 3, and processes them to a desired result. This result may, for example, encompass an ascertained position or location or movement direction. However, it shall be understood that arbitrary other suitable processing results are also possible.

As is apparent from FIG. 1, the output of a signal processing unit 2-1 may be connected to an input of a further signal processing unit 2-2. Of course, multisensor system 10 is not limited to an arrangement including one or, as is shown in FIG. 1, two series connected signal processing units 2-*j*. Rather, an arrangement including more than two series connected signal processing units 2-*j* is also possible. In this way, for example, it is also possible for three, four, five or possibly even more signal processing units 2-*j* to be provided between individual signal sources 1-*i* and a final processing unit 3.

Furthermore, it is also possible, for example, to couple an output of a signal processing unit 2-*j* to an input of a signal processing unit 2-*j* situated earlier in the signal flow. In this way, a feedback in the signal flow may be implemented, for example.

Figure 2:
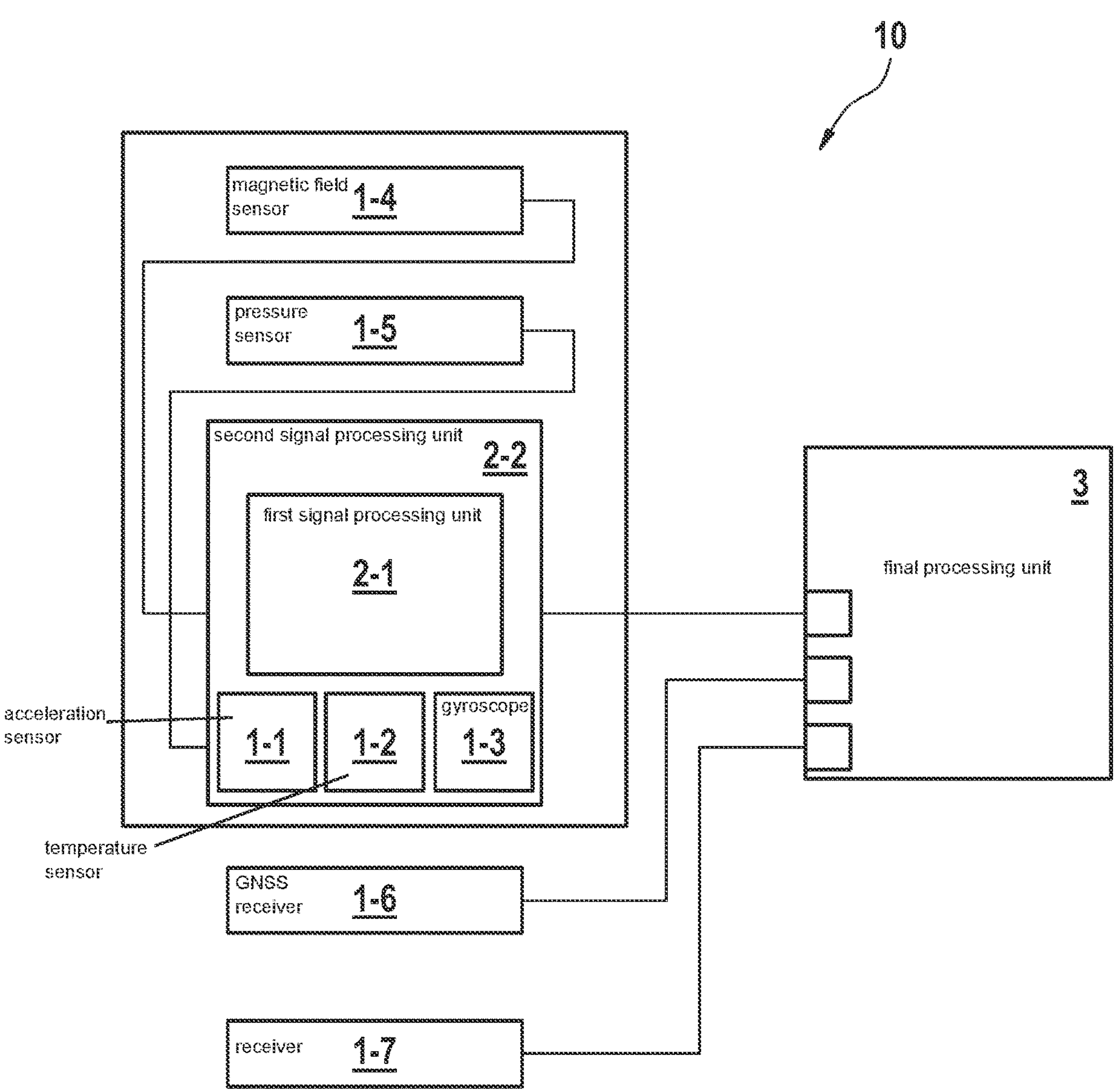
FIG. 2 shows a schematic representation of a multisensor system according to one further specific embodiment of the present invention.

FIG. 2 shows a schematic representation of a block diagram of a multisensor system 10 according to a further specific embodiment. For better illustration, this multisensor system 10 is a system for determining a position or an orientation. As was already described above, however, the present invention is not limited to such applications.

The exemplary embodiment according to FIG. 2 includes a first signal processing unit 2-1 which receives, processes and fuses the signals of an acceleration sensor 1-1, a temperature sensor 1-2 as well as a gyroscope 1-3. For example, first signal processing unit 2-1 may be implemented, together with acceleration sensor 1-1, temperature sensor 1-2 and gyroscope 1-3, as a shared unit. For example, all components may be implemented on a shared chip as a system on a chip. The result of this fusion of the signals of acceleration sensor 1-1, temperature sensor 1-2 and gyroscope 1-3 may thereupon be combined with signals of a magnetic field sensor 1-4 and a pressure sensor 1-5 with the aid of a second signal processing unit 2-2. The result of this fusion may thereupon be provided to final processing unit 3, which additionally receives further signals, for example from a GNSS receiver 1-6 and/or a receiver 1-7 of a radio system.

Figure 3:
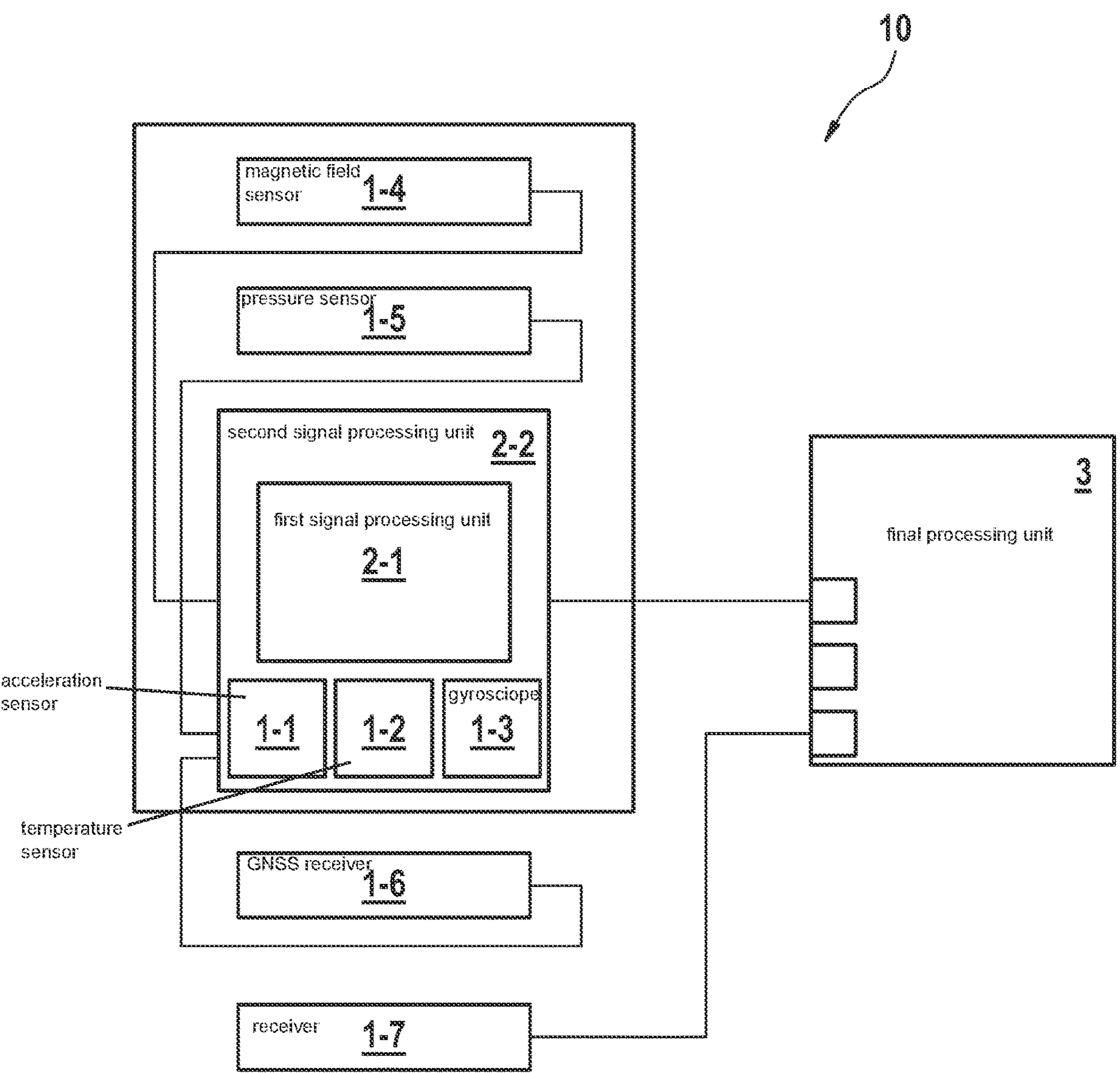
FIG. 3 shows a schematic representation of a block diagram of a multisensor system according to yet another specific embodiment of the present invention.

FIG. 3 shows a schematic representation of a block diagram of a multisensor system 10 according to yet another specific embodiment. The configuration of multisensor system 10 described in FIG. 3 corresponds to the above-described multisensor system 10 from FIG. 2. The exemplary embodiment of FIG. 3 differs from the above-described exemplary embodiment, in particular, in that the signals of GNSS receiver 1-6 are not directly provided at final processing unit 3, but are also initially preprocessed with the aid of second signal processing unit 2-2.

In summary, the present invention relates to the segmentation of the processing of sensor signals in a multisensor system. For this purpose, for example, the calculation or signal fusion of signal sources, such as for example sensors or the like, may be partitioned into several small steps. In this way, a suitable individual signal processing unit may be used for each sub-calculation and sub-signal fusion. The first processing of the signals is preferably situated at a corresponding signal source. In particular, in this way, only a minimum of pieces of information may thus be transferred in each case from a signal source or a signal processing unit to the next instance, i.e., a further signal processing unit or a final processing unit.

What is claimed is:

1. A multisensor system, comprising:

a first number of signal sources, each configured to generate a signal corresponding to a detected variable; and a second number of signal processors, wherein each signal processor is configured to: (i) receive signals of: at least one signal source and/or at least one signal processor, (ii) process the received signals, and (iii) provide the processed/fused signals to a further signal processor or a final processing unit, wherein the processing of the received signals in the signal processor includes a fusion of the received signals, wherein the signal processor are configured to provide the fused received signals at a clock rate which corresponds to the input clock rate of the further signal processor or the final processing unit sufficient to ensure correct processing of the fused received signals, wherein the fusion of signals is performed in a partitioned and incremental manner across multiple separate processing units, and wherein at least one signal processor is configured to provide feedback to an earlier signal processor in the signal flow to implement a stable control loop, and wherein each signal processor of the second number of signal processors is configured to adapt its output clock rate to the input clock rate of the further signal processor or the final processing unit to which its fused signals are provided.

2. The multisensor system as recited in claim 1, wherein an output of a signal processor of the processors signal is coupled to an input of another signal processor of the processors situated earlier in a signal flow.

3. The multisensor system as recited in claim 1, wherein the signal processors are configured to process input signals at an identical or at least approximately identical clock rate.

4. The multisensor system as recited in claim 1, wherein each signal source of the first number of signal sources is connected to either a signal processor of the second number of signal processors or the final processor.

5. The multisensor system as recited in claim 1, wherein the signal processors each also include at least one of the signal sources.

6. The multisensor system as recited in claim 1, wherein the signal processors or a combination of a signal processor of the signal processors and a signal source of the signal sources is implemented as a system on a chip.

7. The multisensor system as recited in claim 1, wherein the first number of signal sources includes a receiver for a global satellite navigation system, and/or a mobile radio communication receiver, and/or a receiver for a local radio network, and/or a magnetic field sensor, and/or a pressure sensor, and/or a rotation rate sensor, and/or an acceleration sensor, and/or a gyroscope.

8. A system for determining a position or an orientation, the system comprising:

a multisensor system including:

a first number of signal sources which are each designed to provide a signal corresponding to a detected variable, and a second number of signal processors which are each configured to: (i) receive signals of: at least one signal source and/or at least one signal processor, (ii) process the received signals, and (iii) provide the processed/fused signals to a further signal processor or a final processing unit, wherein the processing of the received signals in the signal processors includes a fusion of the received signals, wherein the signal processor are configured to provide the fused received signals at a clock rate which corresponds to the input clock rate of the further signal processor or the final processing unit sufficient to ensure correct processing of the fused received signals, wherein the fusion of signals is performed in a partitioned and incremental manner across multiple separate processing units, and wherein at least one signal processor is configured to provide feedback to an earlier signal processor in the signal flow to implement a stable control loop, and wherein each signal processor of the second number of signal processors is configured to adapt its output clock rate to the input clock rate of the further signal processor or the final processing unit to which its fused signals are provided.

* * * * *